May 4, 1943.  W. HOTINE

CIRCUIT CONTROL DEVICE

Filed Nov. 14, 1939  3 Sheets-Sheet 1

INVENTOR
William Hotine

INVENTOR
William Hotine

May 4, 1943.  W. HOTINE  2,318,...

CIRCUIT CONTROL DEVICE

Filed Nov. 14, 1939  3 Sheets-Sheet 3

INVENTOR
William Hotine

Patented May 4, 1943

2,318,223

UNITED STATES PATENT OFFICE 2,318,223

CIRCUIT CONTROL DEVICE

William Hotine, Westbury, N. Y.

Application November 14, 1939, Serial No. 304,315

24 Claims. (Cl. 171—222)

My invention relates to speed control devices for electrical equipment.

An object of my invention is to utilize the rotation of a shaft to vary the conducting properties of an electrical device.

A further object of my invention is to provide a circuit control device in which the current impulses through the device are controlled by the relative position of two rotatable interrupters.

A further object of my invention is to utilize the momentum of one rotating part, relatively stable with respect to another rotatable part which is subject to variations in rotation, for relatively displacing electrically conducting and non-conducting elements of a circuit.

A further object is to provide a rotatable switching device in which the time interval between the passage and non-passage of current in a circuit including the device is varied automatically by the relative speeds of the rotatable elements thereof.

Still a further object is to provide a control device for electrical circuits operated automatically by the rotational speed of the shaft driven in any manner.

The foregoing objects, and others which appear from the annexed drawings and accompanying specification, I accomplish, in one form of my invention, by providing two commutators or interrupters, each comprising equal segments of inter-connected conducting and non-conducting or insulation material, on two rotatable parts. One of the rotatable parts is rigidly mounted integral with a shaft, while the other rotatable part is rotatably mounted on the shaft and is capable of independent limited rotation relative to the shaft. Upon rotation of the shaft, the independently limitedly rotatable element, due to its inertia will tend to continue rotating at the stabilized speed of the shaft, while the integral rotatable part will vary in its speed of rotation with the instantaneous variations in speed of the shaft, thereby displacing the relative positions of the commutator segments on one commutator in respect of those of the other. Thus in the external circuit, connecting one set of commutator segments to the other, the potential and the time of its application and duration will be varied as determined by such relative displacement. In another preferred form of my invention instead of relatively displacing two groups of commutator segments in this way, I displace the relative position of the brushes contacting the commutators, thereby producing the aforementioned variations in the external circuit.

My invention both as to its organization and method of operation, together with additional objects and advantages, will best be understood from the following description when read in connection with the accompanying drawings, in which:

Figure 1 discloses one form of my automatic control device viewed from the commutator end face, with a schematic of the electrical circuit and a motor drive for the shaft;

Figure 7:
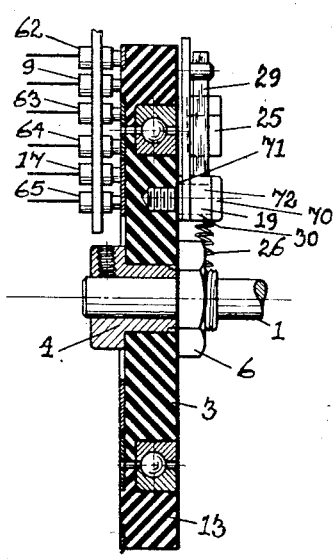
Figure 6:
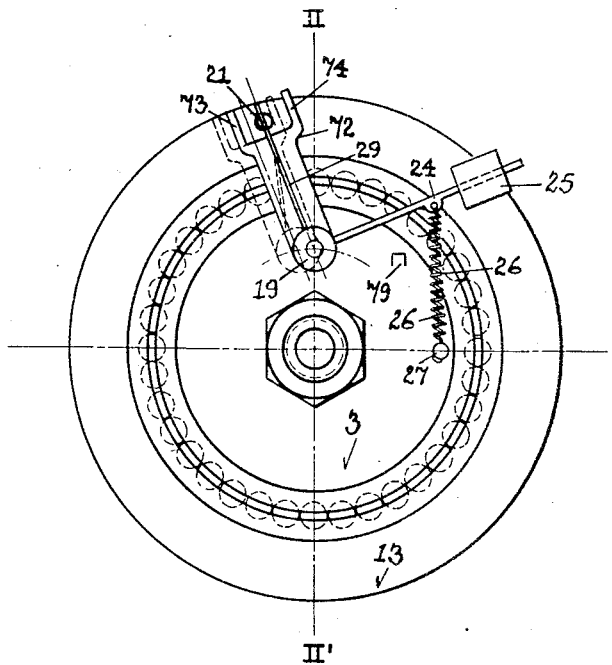
Figure 6 shows a plan view of a modified form of my invention from the governor side disclosing a modified governor.
Figure 8:
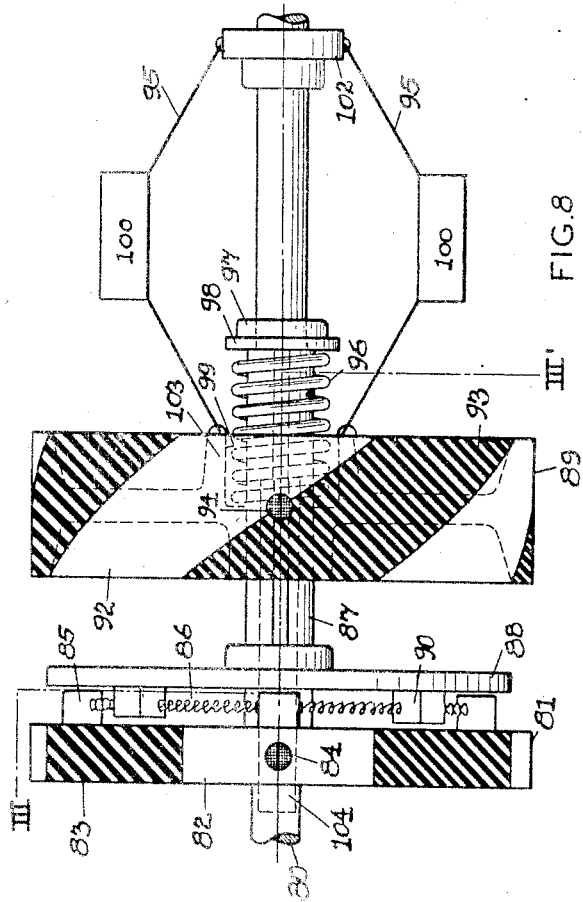
Figure 9:
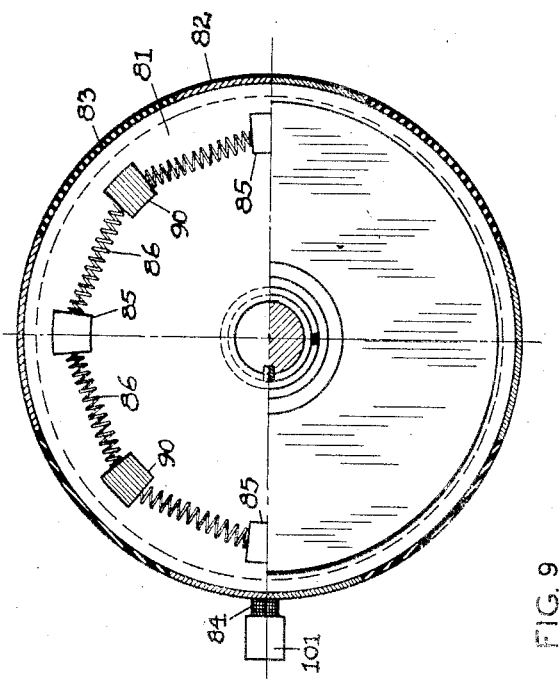

Figure 7 a section through the device of Figure 6 on the line II—II' of Figure 6;

Figure 8 a longitudinal view of another form of my invention with peripheral commutator segments;

Figure 9 an end view thereof in the direction of the line III—III' and partially broken away.

Figure 3:
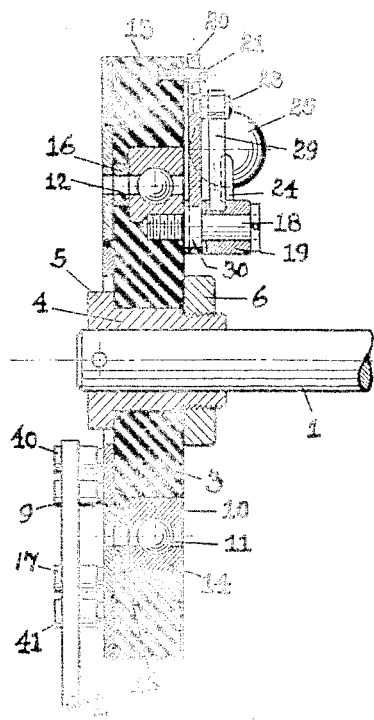
Figure 3 shows a section along the line I—I' of Figure 2 with a schematic of the motor connection.
Figure 4:
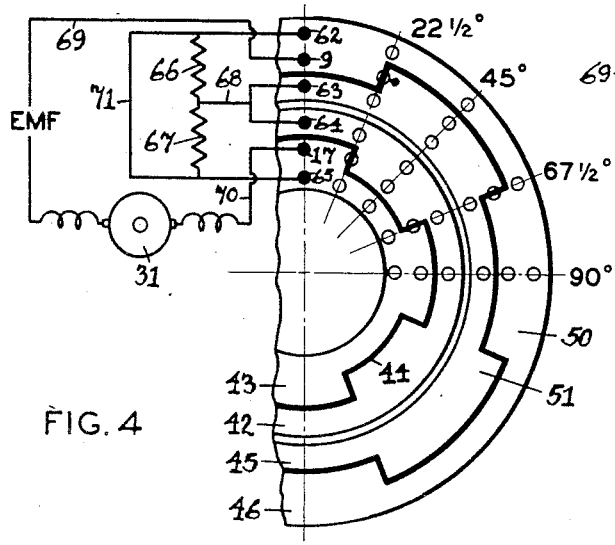
Figure 4 shows a schematic arrangement of the form of my device of Figures 6 and 7.
Figure 5:
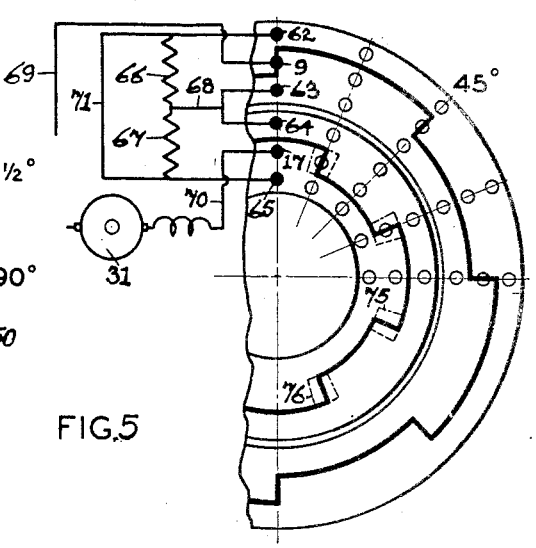
Figure 5 shows a schematic of the phase displacement of the form of my device of Figures 6 and 7.

Referring to Figure 3, annular ring 3 of insulating material is rigidly mounted on the rotatable shaft 1 by means of sleeve 4, having an integral annular shoulder 5 at one end and a thread at the other end to receive the clamping nut 6. Imbedded in one face of ring 3 are a plurality of conducting segments 8, four in the structure shown in Figure 1, comprising sectors of the ring and spaced equidistant on such face and having between each successive pair a sector 7 of insulating material of a width equal to that of a conducting segment. The exposed faces of the conducting segments 8 and of the insulating segments 7 are coplanar, and riding thereon is brush 9 held in position by holder 2. About the periphery of ring 3 is fixed the inner race 10 of the ball bearing 11 and so disposed that the race is electrically connected to the conducting segments 8 by intervening ring 12 of conducting material on the periphery of ring 3.

An annular ring 13 of insulating material, carrying at its internal periphery the outer ball race 14 of ball bearing 11, is disposed about ring 3. On the face of ring 13 corresponding to the commutator face of ring 3, are embedded conductor segments 32, equal in number to those on ring 3, having equal width intervening sectors 15 of non-conducting portions of ring 13, coplanar with conducting segments 32. The latter are electrically connected to ball race 14 by conducting ring 16 on the inner periphery of ring 13. The brush 17, carried by holder 2, engages the commutating surface of ring 13.

Extending from the non-commutator end surface of ring 3, a pivot pin 18 is permanently mounted on said ring. Two levers, comprising respectively sleeve 30 and arm 20, and sleeve 19 and governor arm 24, are pivotally mounted on pin 18 so as to be capable of independent movement relative to each other. At its non-pivoted end, governor arm 24 carries flyweight 25, which may be fixed in its distance from the pivot, as in Figure 1, or adjustable, as in Figure 2. Near the flyweight end thereof is a spring 26 connected to said arm and to pin 27 fixed in ring 3. The arm 20, normally at an angle to governor arm 24, approximately a right angle in the drawings, is forked, 22, 23, at its non-pivoted end, the fork engaging between its prongs a pin 21 fixed in ring 13. On arm 20, somewhat below the forked end thereof, is a fixed pin 28 the extending portion of which is split and engages a flat spring 29, the other end of which is fixed in sleeve 19. The drive of ring 13 is thus by way of pin 21, arm 20, pin 28, spring 29, sleeve 19, and pin 18, carrying ring 13 along with ring 3 on rotation of the latter.

When ring 3 rotates at constant speed, or at a gradual variation therefrom, the position of arm 24, caused by the centrifugal force, will determine the position of ring 13 relative to ring 3. Spring 29 is selected for stiffness so that the bending force exerted on it at small rates of change of speed by the inertia of ring 13, will bend spring 29 but slightly; or not at all, if the rate of change of speed is small enough. When, however, a sudden change of speed of ring 3 occurs, the inertia of ring 13 exerts a sufficient force to bend spring 29. Arm 24, sufficient time not having elapsed to build up centrifugal force, will not change its position. Thus at high rates of change of speed of ring 3, the inertia of ring 13 causes a relative displacement of ring 13 to ring 3, while at low rates of change of speed of ring 3, the angular displacement of arm 24 caused by the centrifugal force will effect a relative displacement of ring 13 to ring 3. The mass of ring 13 is preferably chosen, and the flexibility of spring 29 chosen, so that the relative displacement of the two rings, and their associated commutators caused by the speed of ring 3 and its rates of change of speed, will be the proper displacement to secure the desired regulating effects.

Figure 1:
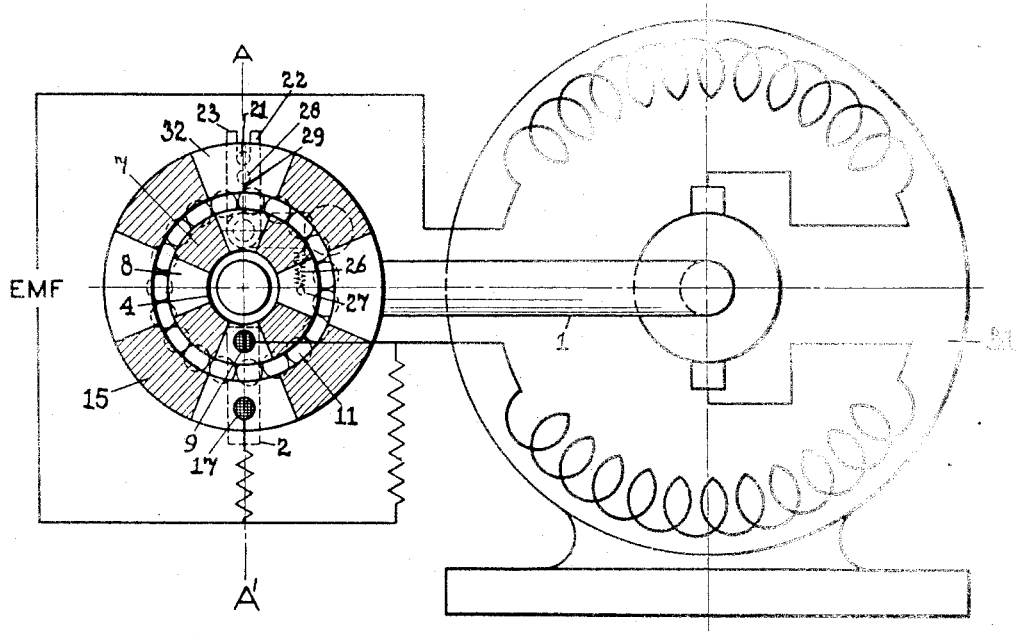
Figure 2:
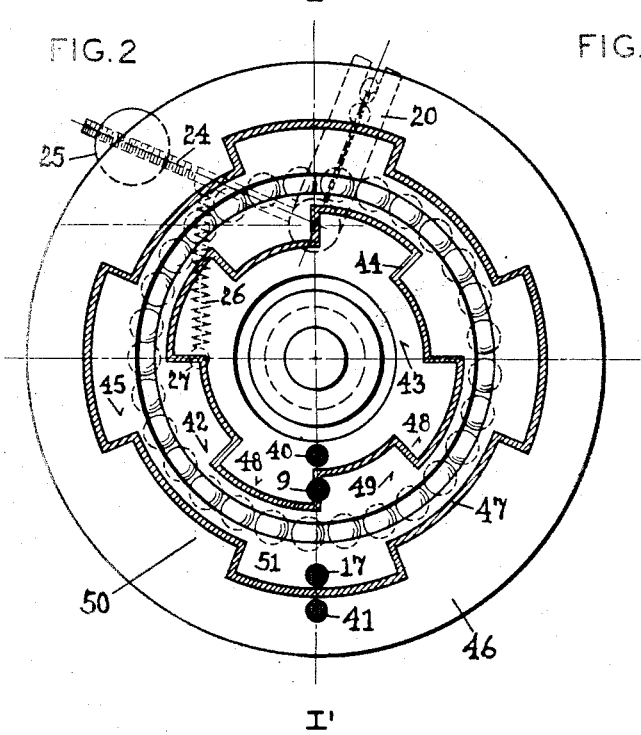
Figure 2 shows a slightly modified form of my device viewed from the commutator end face thereof.

The foregoing description applies equally well to Figure 1 and to Figures 2 and 3, a section along line A—A' of Figure 1 being the same as the section shown in Figure 3, with the exception that the latter shows a differing commutator configuration. In both forms of my invention shaft 1 is driven by the electric motor 31.

On rotation of shaft 1 by motor 31, spring 26 permits the flyball 25 to move outwardly from the center of rotation. Consider the shaft 1 and ring 3 as just having commenced to rotate, with ring 13 still stationary. Ring 3 may advance angularly only until arm 20 and spring 29, acting as a connecting link non-extendable longitudinally, drags ring 13 along. The mass of flyball 25 and its position on arm 24, and the tension of spring 26, are selectively predetermined so that when balance at a predetermined, absolute or normal rate of rotation of shaft 1 is established, the segments of similar electrical character of rings 3 and 13 are displaced relative to each other one half their circumferential length, that is, one-half their central angle.

Consider shaft 1 of Figs. 1 and 3 rotating in a clockwise direction. The drive of ring 13 by ring 3 at the predetermined absolute speed is by spring 29 through its connection with sleeve 19 on ring 3 and pin 28 on arm 20. Slight, sharp variations of the speeds of either of the rings 3 or 13 relative to each other is taken up by the spring 29. The variation of the speed of the two rings does not last long enough to cause a centrifugal force to act on the fly ball 25, as shaft 1 slows up or speeds up. Due to the inertia of the heavy ring 13, its speed is maintained almost uniform. When ring 3 tends to outrun ring 13, spring 29 is flexed concavely when viewed in the direction of rotation of shaft 1, due to its connection to ring 3 (sleeve 19) and to ring 13 (arm 20, pin 21 and pin 28). Spring 29, thus being charged, will tend to straighten itself out, bringing back into position rings 3 and 13, so that segments of similar electrical characteristics are again displaced one-half their central angle relative to each other.

Should the rotation of shaft 1 slow down momentarily, so that ring 3 tends to under run ring 13, spring 29 will be flexed in a convex manner, when viewed in the direction of rotation of shaft 1. Charged spring 29 will thus tend to accelerate the rotation of ring 3 so that like segments will again be displaced one half their central angle with respect to each other.

Thus it can be seen that for slight, sharp variations in the relative speeds of the rings 3 and 13, spring 29 will displace rings 3 and 13 with respect to each other to bring about the desired regulating results.

On the other hand, where the variations of the relative speeds of the two rings, 3 and 13, are of long duration, as where ring 13, due to its inertia tends to over run or under run ring 3, governor arm 24 will bring about the desired displacement of rings 3 and 13.

Where the variations in speed are of long duration, centrifugal force will act upon the fly ball 25, to rotate arm 24 about the pin 18. In rotating arm 24 about pin 18, sleeve 19 is rotated. Spring 29, being fixed in sleeve 19 will be flexed in the manner heretofore described. Spring 29 in straightening out will displace the rings 3 and 13 relative to each other, so that the segments of similar electrical characteristics are again displaced one half of their central angle relative to each other.

It is to be noted that where the variations of the relative speeds of the two rings 3 and 13 are slight and of very short duration, spring 29 is flexed slightly, and in tending to straighten out vibrates slightly. Where the variations of the relative speeds of the two rings are of relatively long duration, so that the fly ball governor may act upon the spring 29, spring 29 will tend to straighten out slowly with little or no vibration.

While the example hereinbefore given has been for the relative displacement of like segments one half their central angles, it is to be understood that any relative displacement is possible, the desired displacement being determined by the moment of the fly ball governor and the stiffness of spring 29.

The form of my invention shown in Figures 2 and 3 differs from that shown in Figure 1 in that both the segments, connecting to an external electrical circuit and disconnecting therefrom, are of conducting material. The commutating surface of ring 3 comprises two formed plates 42 and 43, separated by the insulating band 44 integral with ring 3, the exposed surfaces of the plates and band being coplanar. The innermost plate 43, which constitutes the disconnecting plate, has in the specific showing of Figure 2, radially extending portions 48 spaced equally about the plate and having between each a projecting portion 49 of the outer plate 42, insulated therefrom by band 44, each fitting into an interstice in the inner plate between two projections 48 equal to the width of a projection 48. The radial extent of the projection is such that the brush 9, engaging the commutating surface of ring 3, will alternately wholly engage a projection 48 of the inner plate and an outer plate projection 49, while brush 40 always engages the inner plate 43. The outer plate 42 is conductively connected to the ball race 10 by ring 12, as were the conducting segments of Figure 1. Outer ring 13 in this construction is provided with a similar inner and outer plate, 45 and 46 respectively, insulated by a band of insulating material 47, with the inner plate 45 electrically connected to ball race 11 by ring 16. Brush 17, on revolution of ring 13, alternately wholly engages a projection 51 of inner plate 45 and a projection 50 of outer plate 46, while auxiliary brush 41 always engages outer plate 46 which is electrically insulated.

Another form of my device with end surface commutation is shown in Figures 4 to 7, inclusive. The commutator segments of each ring 3 and 13 are again of the formed inner and outer plate type of Figures 2 and 3. However, in this specific embodiment, the inner commutator plate 45 of ring 13 is electrically insulated from the ball race 14, and the outer commutator plate 42 of ring 3 is also insulated from ball race 10. Ring 13 has engaging its commutator surface not only main brush 9 in the path of the interlocking projections 50 and 51, of inner plate 45 and outer plate 46, but also two auxiliary brushes, 62 and 63, with brush 62 always in engagement with outer plate 46 and brush 63 always in engagement with inner plate 45. Similarly ring 3 has engaging its commutator surface not only main brush 17 in the path of the interlocking projections of its inner plate 43 and outer plate 42, but also two auxiliary brushes 64 and 65, with brush 64 always engaging the outer plate 42 and auxiliary brush 65 always engaging inner plate 43.

As in the previously described specific forms of my invention, the mechanical flyweight system is so predetermined that for steady running state, the corresponding projections of the inner and outer plates of the respective commutators are displaced relative to each other one half the central angle of a plate projection or interstice. In the structure of Figures 4 to 7, each plate has four projections and four interstices, all equal, and hence the predetermined displacement of similar commutator segments by the flyweight system is 22½°. Such steady state running condition is shown in a mechanical schematic in Figure 5.

The details of the flyweight mechanism are shown in Figures 6 and 7, the latter being a section on the line II—II' shown in Figure 6. Pin 30 is threaded into ring 3 and has rotatable thereon sleeve 19, held against lateral displacement between washer 71 engaging the surface of the ring and the head 70 of pin 30. Rigid in sleeve 19 is the flyball arm 24 carrying flyweight 25 at a distance from sleeve 19 which is adjustable, by any known means, such as the screw thread shown in Figure 6. Spring 26 connected between arm 24 and ring 3 is provided to resist the centrifugal force on flyweight 25 on rotation of ring 3. Stop 79, projecting from ring 3, is in the path of arm 24 and when the tension of spring 26 is greater than the centrifugal force the stop limits the motion of arm 24 inwardly toward the axis of rotation. Arm 72, at a predetermined angle relative arm 24, is integral with sleeve 19 and extends radially outwardly, having at its outer end the spaced prongs 73 and 74. Slotted pin 21, fast upon ring 13, projects into the space between said prongs and in the steady state condition occupies a position about midway between them. One end of flat spring 29 lies within and slides in the slot of pin 21, the other spring end being fastened in sleeve 19. On a variation from the steady state, pin 21 moving toward one of the prongs, 73 or 74, flexes the spring 29.

The forms of my automatic control device hereinbefore described have employed commutating elements disposed on the end face of the rotatable elements. The forms shown in the Figures 8 and 9 as distinguished therefrom, employ commutating elements disposed on the periphery thereof and may have external electrical connections like those shown for the form of my invention disclosed in Figure 1. With such arrangement of the commutating surfaces, the brushes are fixed and the peripheral commutator elements laterally displaceable, as in the device of Figures 8 and 9.

Referring to Figures 8 and 9, shaft 80, driven by a motor not shown, carries a rotatable drum 81 having on its cylindrical periphery an equal number of conducting 82 and insulating 83 segments, each conducting segment being of the same peripheral extent as each insulating segment. Brush 84, supported in fixed brush holder 104 and connected to the external circuit, engages the periphery of drum 81. A plurality of lugs 85 are provided on one end face of drum 81, circularly disposed about shaft 80, the lugs anchoring one end of the springs 86. A sleeve 87 is rigidly keyed to shaft 80 and carries at its end nearest drum 81 a disc 88 integral therewith and provided with lugs 90 on its face adjacent drum 81 which anchor the other ends of springs 86. Splined on sleeve 87 and laterally displaceable thereon, is a second drum 89 having on its periphery the same (as on drum 81) equal number of conducting 92 and insulating 93 segments, each conducting segment being of the same area and configuration as each insulating segment. Conducting segments 92 are so positioned that their peripheral boundaries, when the commencement of one is aligned with the boundary of a conducting segment on drum 81, form an angle with the said extended boundary of a conducting segment of drum 81 and extend to the beginning of the next (extended) boundary of the succeeding conducting segment on drum 81.

Fixed brush 94, likewise carried by brush holder 104, engages the commutating periphery of drum 89 and is so disposed that at the steady state of rotation it rides thereon midway the width of said drum 89, which is appreciably wider than said brush. Retaining the drum 89 in such position laterally at the steady state are the opposing pressures of springs 95 and 96. Compression spring 96, placed about the sleeve 87, bears upon the recessed hub 99 of drum 89 at its one end, and through washer 98 against shoulder 97 at its other end, and tends to displace drum 89 to the left in the showing of Figure 8. A plurality of springs 95, carrying flyweights 100, are connected at one end of each to fixed shoulder 102 and at the other end of each to projecting ring 103 integral with drum 89. It is obvious that on rotation of shaft 80, the instantaneous position of fixed brush along the width of the peripheral commutating segments of drum 89 will be determined by the opposing forces of spring 96 and that of the centrifugal force on flyweights 100 and flyweight springs 95.

As stated, in the steady state of rotation brush 94 engages drum 89 midway the lateral peripheral width. It will further be noted, as shown in Figure 8, that at the steady state condition similar commutating segments on drums 81 and 89 are relatively displaced, at the line of engagement with their respective brushes, one half the central angle subtended by their equal segments. Thus in the specific structure there are four conducting and four non-conducting segments on each drum, and the steady state displacement is 22½°. As drum 81 is driven solely through springs 86 from shaft 80, it has a flywheel effect and tends to maintain its uniform momentum in the face of any change in speed, thus causing a variation in the relative displacement of the segments of drums 81 and 89. The conducting segments on drum 81 are all electrically connected, and in turn connected electrically, conveniently by way of shaft 80, to the conducting segments on drum 89, likewise connected to each other electrically. Obviously the angle the commutator segments make with the axis of rotation of the drum may be varied, as also the configuration of the segments, thereby selectively altering the regulating characteristics.

Although I have shown and described certain specific embodiments of my invention, I am fully aware that many modifications thereof are possible. My invention, therefore, is not to be restricted except in so far as is necessitated by the prior art and by the spirit of the appended claims. The device is obviously useful to control the speed of an electric motor and to automatically regulate the output characteristics of other electrical devices, such as generators or dynamos under varying conditions of load and speed; or to control the action of relays or solenoids for regulating engines or mechanical devices under varying conditions of load and speed. The varying amount of electric current flowing through the proper regulatory circuit as controlled by my device is used to accomplish such regulation and control as desired.

What I claim is:

1. A circuit control device comprising two rotatable circuit interrupters, circuit making elements thereon all connected to each other, means for driving said interrupters, contacts cooperating with individual interrupters, and speed responsive means displacing the point of engagement of a contact and the circuit making elements of its interrupter relative that of a similar contact and the circuit making elements of the other interrupter.

2. A circuit control device comprising two rotatable circuit interrupters, circuit making elements thereon all connected to each other, means for driving one of said interrupters, contacts cooperating with individual interrupters, a yielding connection between the driven interrupter and the other interrupter, and means responsive to the speed of the driven interrupter and to the rate of change of speed of one interrupter relative that of the other interrupter to displace the point of engagement of a contact and the circuit making elements of one interrupter relative such point of engagement of a similar contact and the circuit making elements of the other interrupter.

3. A circuit control device comprising two rotatable circuit interrupters, circuit making elements thereon all connected to each other, means for driving one of said interrupters, contacts cooperating with individual interrupters, a yielding connection between the driven interrupter and the other interrupter, and means responsive to the rate of change of the speed of one interrupter relative that of the other interrupter to displace the point of engagement of a contact and the circuit making elements of one interrupter relative such point of engagement of a similar contact and the circuit making elements of the other interrupter.

4. A circuit control device comprising a first commutator having a plurality of equal segments alternately of conducting and insulating material, a first brush engaging said first commutator, a second commutator having the same plurality of equal segments alternately of conducting and insulating material, a second brush engaging said second commutator, an electrical connector between all said conducting segments of both commutators, a means for rotating said commutators, and means responsive to the speed thereof for relatively displacing the points of engagement of the brushes with their respective commutators.

5. A circuit control device comprising a first commutator having a plurality of equal segments alternately of conducting and insulating material, a first brush engaging said first commutator, a second commutator having the same plurality of equal segments alternately of conducting and insulating material, a second brush engaging said second commutator, an electrical connector between all said conducting segments of both commutators, means for driving one of said commutators, a yielding driving connection between said driven commutator and the other commutator, and means responsive to the absolute speed of the driven commutator and to the relative speed of the commutators with respect to each other for relatively displacing the points of engagement of the brushes with their respective commutators.

6. A circuit control device comprising a first commutator having a plurality of equal segments alternately of conducting and insulating material, a first brush engaging said first commutator, a second commutator having the same plurality of equal segments alternately of conducting and insulating material, a second brush engaging said second commutator, an electrical connector between all said conducting segments of both commutators, means for driving one of said commutators, a yielding driving connection between said commutators, and means responsive to the rate of change in the speed of either commutator relative that of the other for displacing the point of engagement of said first brush and the conducting segments of the first commutator relative the point of engagement of the second brush and the conducting segments of the second commutator.

7. A circuit control device comprising a commutator having a plurality of alternate circuit making and circuit breaking portions each subtending the same central angle, a contact therefor, a second commutator having the same plurality of alternate circuit making and circuit breaking portions each subtending the same central angle as the portions of the first commutator, a second contact therefor, an electrical connection between all the circuit making portions of the first commutator to all the circuit making portions of the second commutator, means for driving one of said commutators, a driving connection between said commutators which is rigid for differences in the relative speeds of said commutators exceeding said central angle and yielding for differences in relative speeds of said commutators less than said central angle, and a speed responsive means on said driven commutator displacing the point of engagement of said first contact and the circuit making portions of said first commutator relative the point of engagement of said second contact and the circuit making portions of said second commutator at a predetermined stabilized speed through an angle less than the said central angle.

8. A circuit control device comprising a commutator having a pluraility of alternate circuit making and circuit breaking portions each subtending the same central angle, a first contact therefor, a second commutator having the same plurality of alternate circuit making and circuit breaking portions each subtending the same central angle as the portions of the first commutator, a second contact therefor, an electrical connection between all the circuit making portions of the first commutator to all the circuit making portions of the second commutator, means for driving one of said commutators, a driving connection between said commutators which is rigid for differences in relative speeds of said commutators exceeding said central angle and yielding for differences in relative speeds of said commutators less than said central angle, and means responsive to the speed of the driven commutator displacing the point of engagement of said first contact and the circuit making portions of the first commutator relative the point of engagement of the second contact and the circuit making portions of the second commutator through an angle less than said central angle at the stabilized speed of the driven commutator, and also responsive to the rate of change in speed of either commutator relative that of the other commutator to further displace said points of engagement relative each other from such stabilized displacement angle in a direction to re-establish said stabilized displacement angle.

9. A circuit control device comprising a first commutator having a plurality of equal segments alternately of conducting and of insulating material with edge boundaries parallel to the axis of the commutator, a first brush engaging said commutator, a second commutator having the same plurality of equal segments alternately of conducting and of insulating material with edge boundaries at an angle to the axis of the second commutator, a second brush engaging said second commutator and of a width less than the width of the second commutator, means for moving said second commutator laterally of and in engagement with said second brush, means for driving said second commutator, a yieldable driving connection between said commutators, and means responsive both to the absolute speed of the driven commutator and to the rate of change in the speed of either commutator relative to the other commutator actuating said second commutator moving means.

10. A circuit control device comprising a first commutator having a plurality of equal segments alternately of conducting and of insulating material with edge boundaries parallel to the axis of the commutator, a first brush engaging said commutator, a second commutator having the same plurality of equal segments alternately of conducting and of insulating material with edge boundaries at an angle to the axis of the second commutator, a second brush engaging said second commutator and of a width less than the width of the second commutator, means for moving said second commutator laterally of and in engagement with said second brush, means for driving said commutators, and speed responsive means actuating said second commutator moving means.

11. A circuit control device comprising a first commutator having a plurality of equal segments alternately of conducting and of insulating material with edge boundaries parallel to the axis of the commutator, a first brush engaging said commutator, a second commutator having the same plurality of equal segments alternately of conducting and of insulating material with edge boundaries at an angle to the axis of the second commutator, a second brush engaging said second commutator and of a width less than the width of the second commutator, means for moving said second commutator laterally of and in engagement with said second brush, means for driving said second commutator, a yieldable driving connection between said commutators, and means responsive to the rate of change in the speed of either commutator relative that of the other commutator for actuating said second commutator moving means.

12. An electric control comprising a commutator having a plurality of equally extending radial segments alternately of conducting and of insulating material, a spatially fixed continuously engaging brush therefor, a second commutator having the same plurality of equally extending radial segments alternately of conducting and of insulating material, said second commutator having a flywheel effect and being coaxially disposed about said first commutator, a spatially fixed continuously engaging brush for said second commutator, a conductive connection between all said radial conducting segments of said first and second commutators, a shaft supporting said first commutator, a motor driving said shaft, a centrifugal force governor on said first commutator, an independently pivotable arm on said first commutator, a spring connecting said governor and said arm, a projection integral with said second commutator, and a fork on said arm engaging said projection.

13. An electric control comprising a first disc commutator, a formed inner plate of conducting material thereon adjacent its axis with a continuous concentric surface adjacent the axis and with equal spaced projecting radial portions in the region thereof remote from the axis, the spacings between successive projections subtending individual central angles equal to each subtended by the projecting portions, a band of insulating material about the outer periphery of said inner plate, a formed outer plate of conducting material on said first disc having integral radial projections fitting into the spacings of said inner plate and insulated therefrom by said band and having an outermost continuous concentric surface of conducting material, a spatially fixed first brush continuously engaging the continuous surface of the inner plate, a second spatially fixed brush continuously engaging alternately the projections of said inner and outer plates, a second disc commutator having thereon a formed inner and a formed outer plate electrically insulated from each other with equal intermeshing projections of the same number and kind as on said first disc commutator and having similar continuous concentric regions of conducting material and disposed about and rotatably supported by said first disc commutator, a spatially fixed third brush continuously engaging the continuous concentric surface of the outer plate of said second commutator, a spatially fixed fourth brush continuously engaging alternately the projections of said inner and outer plates of said second commutator, a conductive connection between the outer plate of said first commutator and the inner plate of said second commutator, a motor, a shaft rotatable by said motor and driving said first commutator, a centrifugal force governor on said first commutator, an arm integral with said governor and pivotable therewith, a fork at the end of said arm, a pin projection integral with said second commutator and extending between the prongs of said fork, and a spring connecting said pin projection and said governor.

14. An electric control comprising a first commutator, an inner formed plate of conducting material on an end face thereof having an unbroken zone adjacent the commutator axis and equal spaced projections at the portion remote from said axis, each projection and each interstice subtending the same central angle, a continuous band of insulating material about the outer periphery of said inner plate, an outer formed plate on conducting material on said end face having integral spaced portions meshing with the interstices of the inner plate insulated therefrom by said continuous band and having an unbroken zone remote from said axis, a spatially fixed first brush continuously engaging successive projections of the inner and outer plates alternately, a spatially fixed second brush continuously engaging the unbroken zone of the inner plate, a spatially fixed third brush continuously engaging the unbroken zone of the outer plate, an annular ring rotatably supported on said first commutator and having a flywheel effect, a second commutator disposed on an end face of said ring and constituted of an inner and an outer conductive plate insulated from each other and having meshing projections equal in number to and subtending the same central angle as those on the first commutator plates and having the same unbroken zones respectively, a fourth spatially fixed brush continuously engaging successive projections on the inner and outer plates of the second commutator alternately, a fifth spatially fixed brush continuously engaging the unbroken zone of the inner plate of the second commutator, a sixth spatially fixed brush continuously engaging the unbroken zone of the outer plate of the second commutator, a conductive first connector between said third and fifth brushes, a second electrical connector connecting said second and sixth brushes, a pair of series connected resistances in shunt of said second connector, a tap connecting the junction point of said resistances to the first connector, an electric circuit connected to said first and fourth brushes, a motor for driving said first commutator, a centrifugal force governor on said first commutator, an arm on said first commutator actuatable by said governor and having a forked non-pivoted end, a projection on said annular ring cooperating with the prongs of said forked end, and a spring connecting said annular ring projection and governor at the pivoted region thereof.

15. An electrical control comprising a shaft, a first commutator having a flywheel effect rotatable thereon and having peripheral segments parallel to the shaft and alternately of conducting and of insulating material and each subtending the same central angle, a spatially fixed contact continuously engaging said commutator, means for driving said shaft, a second commutator rotatably rigid on said shaft but laterally displaceable thereon and having peripheral segments at an angle to the shaft and alternately of conducting and of insulating material and each subtending in planes perpendicular to the shaft the same central angle as those of the first commutator, a conductive connection between all conducting segments of both commutators, a second spatially fixed contact continuously engaging said second commutator and of a width less than the width of the second commutator, a resilient driving connection between said commutators, and a centrifugal force governor rigidly attached at one end to said shaft and at the other end to said second commutator.

16. In combination with an electric circuit, two rotatable interrupters, and means responsive to the rate of change in the relative speed of said interrupters conductively connecting said interrupters in said circuit for varying periods of time.

17. In combination with an electric circuit, two rotatable interrupters in said circuit, means permitting relative rotation of the interrupters with respect to each other, and means responsive to such relative rotation for varying the period of interruption of said circuit.

18. In combination with an electric circuit, two rotatable interrupters in said circuit, and means responsive to the rate of change in speed of rotation of either interrupter for varying the period of interruption of said circuit.

19. A circuit control device comprising, two independently rotatable circuit interrupters, circuit making elements on said interrupters electrically connected to each other, contacts cooperating with individual interrupters, means for driving one of said interrupters, a yielding connection between the driven interrupter and the second of said interrupters, said second interrupter having flywheel characteristics, and speed responsive means to displace the point of engagement of a contact and the circuit making elements of one interrupter relative such point of engagement of a similar contact and the circuit making elements of the other interrupter.

20. A circuit control device comprising, two independently rotatable circuit interrupters, circuit making elements on said interrupters electrically connected to each other, contacts cooperating with individual interrupters, means for driving one of said interrupters, a yielding connection between the driven interrupter and the second of said interrupters, said second interrupter having flywheel characteristics, and speed responsive means to displace the point of engagement of a contact and the circuit making elements of one interrupter relative such point of engagement of a similar contact and the circuit making elements of the other interrupter, said speed responsive means including a centrifugal governor on said first interrupter.

21. A circuit control device comprising, two independently rotatable circuit interrupters, circuit making elements on said interrupters electrically connected to each other, contacts cooperating with individual interrupters, means for driving one of said interrupters, a yielding connection between the motor driven interrupter and the second of said interrupters, said second interrupters having flywheel characteristics, and speed responsive means to displace the point of engagement of a contact and the circuit making elements of one interrupter relative such point of engagement of a similar contact and the circuit making elements of the other interrupter, said speed responsive means including a centrifugal governor on said first interrupter, and including a rigid driving connection for said second interrupter between predetermined limits of changes in the points of engagement of said contacts with the circuit making elements of their respective interrupters.

22. A circuit control device comprising, two independently rotatable circuit interrupters, circuit making elements on said interrupters electrically connected to each other, contacts cooperating with individual interrupters, means for driving one of said interrupters, resilient connecting means between the driven interrupter and the second of said interrupters, said second interrupter having flywheel characteristics, and speed responsive means to displace the point of engagement of a contact and the circuit making elements of one interrupter relative such point of engagement of a similar contact and the circuit making elements of the other interrupter, said speed responsive means including a centrifugal governor on said first interrupter.

23. A circuit control device comprising, two rotatable circuit interrupters, alternate circuit making and circuit breaking elements thereon, means for driving said interrupters, contacts cooperating with individual interrupters, and speed responsive means for displacing the point of engagement of a contact and the circuit making elements of its interrupter relative to the point of engagement of a similar contact with the circuit making elements of the other interrupter.

24. A circuit control device comprising, a first commutator having equal segments alternately of circuit making and circuit breaking elements, a brush engaging said commutator, a second commutator having the same plurality of equal segments alternately of circuit making and circuit breaking elements, a second brush engaging said second commutator, means for rotating one of said commutators, a yielding driving connection between the driven commutator and the other commutator, means for relatively displacing the points of engagement of said brushes with their respective commutators, and means responsive to the rate of change in speed of either commutator relative to that of the other commutator to actuate said displacing means.

WILLIAM HOTINE.